(12) United States Patent
Yasuhara

(10) Patent No.: US 10,835,820 B2
(45) Date of Patent: Nov. 17, 2020

(54) SERVER DEVICE, METHOD FOR CONTROLLING THE SAME, COMPUTER-READABLE RECORDING MEDIUM AND GAME SYSTEM

(71) Applicant: GREE, Inc., Tokyo (JP)

(72) Inventor: Tomoki Yasuhara, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 16/425,161

(22) Filed: May 29, 2019

(65) Prior Publication Data

US 2019/0275425 A1 Sep. 12, 2019

Related U.S. Application Data

(63) Continuation of application No. 16/183,820, filed on Nov. 8, 2018, now Pat. No. 10,343,066, which is a continuation of application No. 15/844,891, filed on Dec. 18, 2017, now Pat. No. 10,159,898, which is a continuation of application No. 14/329,185, filed on Jul. 11, 2014, now Pat. No. 9,873,047.

(30) Foreign Application Priority Data

Jul. 12, 2013 (JP) ................................. 2013-147093
Mar. 3, 2014 (JP) ................................. 2014-040076

(51) Int. Cl.
*A63F 13/50* (2014.01)
*A63F 13/355* (2014.01)
*A63F 13/795* (2014.01)

(52) U.S. Cl.
CPC ............ *A63F 13/50* (2014.09); *A63F 13/355* (2014.09); *A63F 13/795* (2014.09)

(58) Field of Classification Search
CPC ....... A63F 13/50; A63F 13/355; A63F 13/795
USPC .......................................................... 463/31
See application file for complete search history.

(56) References Cited

U.S. PATENT DOCUMENTS 6,409,604 B1 6/2002 Matsuno
6,561,901 B1 5/2003 Takase
(Continued)

FOREIGN PATENT DOCUMENTS

JP 2002-346233 A 12/2002
JP 2004-113451 A 4/2004
(Continued)

OTHER PUBLICATIONS

ASCII Media Works Inc., "Guardian Cross," Dengeki Game Appli, Apr. 13, 2013, vol. 9, pp. 72-74, with English language statement of relevance.
(Continued)

*Primary Examiner* — Allen Chan
(74) *Attorney, Agent, or Firm* — Maier & Maier, PLLC

(57) ABSTRACT

A social game capable of informing a player of the attractiveness of a group fighting event is disclosed herein. A server device comprises: an information storage unit that stores information on the game; and a control unit that executes an arithmetic operation relating to the game and performs processing to display an image of the game at the terminal devices. The information storage unit stores, as a part of the information on the game, information on a fighting event, and the control unit performs processing to, in accordance with an instruction from a player, display the information on the fighting event at a terminal device operated by the player.

20 Claims, 11 Drawing Sheets

(56) References Cited

U.S. PATENT DOCUMENTS

| | | |
|---|---|---|
| 6,607,444 B2 | 8/2003 | Takahashi et al. |
| 7,175,530 B2 | 2/2007 | Takahashi et al. |
| 7,789,741 B1 | 9/2010 | Fields |
| 2002/0183115 A1 | 12/2002 | Takahashi et al. |
| 2002/0183116 A1 | 12/2002 | Takahashi et al. |
| 2002/0183117 A1 | 12/2002 | Takahashi et al. |
| 2003/0040364 A1 | 2/2003 | Yabe |
| 2007/0117635 A1 | 5/2007 | Spanton |
| 2009/0182826 A1 | 7/2009 | Izumi |
| 2009/0253475 A1 | 10/2009 | Thompson |
| 2011/0098117 A1 | 4/2011 | Tanaka |
| 2013/0005480 A1 | 1/2013 | Bethke |

FOREIGN PATENT DOCUMENTS

| | | |
|---|---|---|
| JP | 2009-039305 A | 2/2009 |
| JP | 2013-063296 A | 4/2013 |
| JP | 2013-066524 A | 4/2013 |

OTHER PUBLICATIONS

Enterbrain, Inc., "The Knights of Avalon (Avaron no Kishi)," Famitsu Mobage, Apr. 25, 2013, No. 15, pp. 36-37, with English language statement of relevance.

Enterbrain, Inc., "The Brave and Lucifer (Yusha to Maoh)," Famitsu Mobage, Mar. 9, 2013, No. 14, p. 63, with English language statement of relevance.

ASCII Media Works Inc., "The Clan Battle of Fate (Unmei no kuranbatoru)," Dengeki Game Appli, Jun. 14, 2013, vol. 10. pp. 22-23, with English language statement of relevance.

Enterbrain, Inc., "The Clan Battle of Fate (Unmei no kuranbatoru)," Famitsu App iPhone and Android, Jan. 2, 2013, No. 005, pp. 68-69, with English language statement of relevance.

Cosmic Shuppan, "sengoku BASARA Card Heroes, Matsuri," Appli Fan, Apr. 10, 2013, vol. 1, No. 2, pp. 168-169, with English language statement of relevance.

ASCII Media Works Inc., "Dragon Poker," Dengeki Game Appli. Feb. 14, 2013, vol. 8. pp. 30-33. with English language statement of relevance.

FIG. 10

| INCENTIVE | | ~T1 |
|---|---|---|
| BELONGING TO GUILD | BASIC POINT+30% | |
| WON IN FIGHTING EVENT | BASIC POINT+50% | |
| FORWARD PLAYER AT THE END OF FIGHTING EVENT | BASIC POINT+20% | |

SERVER DEVICE, METHOD FOR CONTROLLING THE SAME, COMPUTER-READABLE RECORDING MEDIUM AND GAME SYSTEM

CROSS-REFERENCE TO RELATED APPLICATIONS

This application is a continuation of U.S. patent application Ser. No. 16/183,820, filed Nov. 8, 2018, entitled "SERVER DEVICE, METHOD FOR CONTROLLING THE SAME, COMPUTER-READABLE RECORDING MEDIUM AND GAME SYSTEM," which is a continuation of U.S. patent application Ser. No. 15/844,891, filed Dec. 18, 2017, now U.S. Pat. No. 10,159,898, issued Dec. 25, 2018, which is a continuation of U.S. patent application Ser. No. 14/329,185, filed Jul. 11, 2014, now U.S. Pat. No. 9,873,047, issued Jan. 23, 2018, which claims priority benefit of Japanese Patent Application No. 2013-147093, filed Jul. 12, 2013, and Japanese Patent Application No. 2014-040076, filed Mar. 3, 2014, the disclosures of which are incorporated herein in their entirety by reference.

BACKGROUND

Disclosed herein are a server device, a method for controlling the same, a computer-readable recording medium, and a game system.

Recently games that are provided from a server device via a communication network to mobile terminals that players are operating have become a hit, and a lot of game titles have been released from a plurality of platforms. There are a wide variety of types and categories of these games, among which social games allowing a plurality of players to participate in the same game are particularly enjoying a boom. Such a social game can be said to use a community-forming network service called a social networking service (SNS).

A known social game utilizing the features of a SNS is configured to, for example, let characters (player characters) manipulated by a plurality of players attack one or a plurality of enemy characters to develop a fighting event such as a battle (combat). In this case, each player can be a member of a specific group such as a guild, a party, a team or a community, which will be described later. Each player beats an enemy character, whereby various rewards such as a point or an item that can be used in the game can be given not only the individual players but also to groups to which the players belong.

Such a fighting event to beat an enemy character by a plurality of player characters is conventionally called a "raid battle" in the field of social games. Alternatively, this may be called a "GvR" where a group or a guild is represented with its first letter (G) and an enemy character in a raid battle as a raid character is represented with its first letter (R) (v denotes versus, the same applies in the following).

Another social game that is widely known offers an individual fighting event that is a one on one fighting of player characters and a group fighting event that is a battle between groups (including not only battles but also competitions such as a team sport). As one example of the latter, JP2013-66524A describes an online game to develop a group fighting event (battle) between a plurality of parties. In this game, when matching of a plurality of parties, to which player characters belong, is established in a coliseum hall as a predetermined virtual space in the game, such a group fighting event (battle) between the parties is performed. Such a direct fighting between groups is conventionally called a "guild battle" in the field of social games, or may be called "GvG" represented with the first letters (G) of the group or the guild as stated above.

SUMMARY

In the case of the aforementioned social game, a player is not allowed to watch a fighting event executed by another player. This means that a player cannot experience how enjoyable the fighting event is before he/she actually participates in the fighting event, and so there is no diversity to enjoy the game, and the player cannot be informed of the attractiveness of a group fighting event.

In order to participate in a group fighting event, a player has to belong to any group as a precondition. To this end, some of this type of games makes a player participate in any group compulsorily at the beginning. Such a precondition cannot be avoided because the game includes a group fighting event. However, some players who do not want to be bound by ties of a group may be forced to participate in a group unwillingly, and so they may leave the group before knowing the attractiveness of the group fighting event or may be away from games in some cases. This fails in letting the player know the attractiveness of the group fighting event and may fail in activating a social game.

In view of such a circumstance, an embodiment of the invention provides a server device, a method for controlling the server device, a computer-readable recording medium, and a game system, which are capable of letting a player know the attractiveness of a group fighting event.

To solve the aforementioned problems, a server device according to the invention disclosed herein provides a game, in which a plurality of players can participate, and that is connected to terminal devices operated by the players via a communication line. The server device comprises: an information storage unit that stores information on the game; and a control unit that accesses the information to execute an arithmetic operation relating to the game and perform processing to display an image of the game at the terminal devices. The information storage unit stores, as a part of the information on the game, information on a fighting event, and the control unit performs processing to, in accordance with an instruction from a player, display the information on the fighting event at a terminal device operated by the player.

A method for controlling a server device according to the invention disclosed herein is to control a server device that provides a game, in which a plurality of players can participate, and that is connected to terminal devices operated by the players via a communication line, the server device comprising: an information storage unit that stores information on the game; and a control unit that accesses the information to execute an arithmetic operation relating to the game and display an image of the game at the terminal devices. The method comprises: operating the information storage unit to store information on a fighting event as a part of the information on the game; and operating the control unit to, in accordance with an instruction from a player, display the information on the fighting event at a terminal device operated by the player.

A recording medium according to the invention disclosed herein can be readable by a computer, the recording medium having stored thereon a computer program to let the computer implement accessing information to execute an arithmetic operation relating to a game and to display an image of the game at the terminal devices; and displaying, in accordance with an instruction from a player, the information on the fighting event at a terminal device operated by the player. The computer may provide a game, in which a plurality of players can participate and be connected to terminal devices operated by the players via a communication line, and can access an information storage unit that stores information on a fighting event as a part of information on the game, A game system according to the invention disclosed herein comprises: a server device that provides a game, in which a plurality of players can participate, and that is connected to terminal devices operated by the players via a communication line; and the terminal devices. The game system comprises: an information storage unit that stores information on the game; and a control unit that accesses the information to execute an arithmetic operation relating to the game and perform processing to display an image of the game at the terminal devices. The information storage unit stores, as a part of the information on the game, information on a fighting event, and the control unit performs processing to, in accordance with an instruction from a player, display the information on the fighting event at a terminal device operated by the player.

Herein, the "player" refers to a user who operates a terminal device, which is a concept corresponding to a client of a client-server system as well, and from the viewpoint of distinguishing it from a user of a server device (a server administrator or the like), this is referred to as a "player". A player typically can participate in a game through a character that acts, behaves, thinks and the like in a virtual game space or an appropriate game content that is associated with the character (hereinafter this is called a "player character" in combination) instead of the player himself/herself. A "player" in the present disclosure mainly represents a player character strictly, and this may be described simply as a "player" in the following. Among characters and appropriate game media associated with the characters in a virtual game space, one that is not operated by a user may be referred to as a "non-player character (NPC)".

A "group" may include a variously-elaborated virtual group having a plurality of members, such as a "guild", a "party", a "team" or a "community", which is a general designation. Such a "group" may be created or formed for each game title, or may be created or formed for each platform, for example, as a common group or a shared group across a plurality of game titles. The present disclosure describes a "fighting event" as a major event between groups, and the invention disclosed herein is not limited to this. For example, a "fighting event" may be an event between a certain player, a non-player character or a group and another player, another non-player character or another group. Herein, a "group" may be made up of a plurality of non-player characters instead of a plurality of players, and a group may be made up of one or more players and one or more non-player characters. A "fighting event" may include a different type of event such as an exchange event between groups that is executed as a part of a social game in addition to a fighting (battle) type event.

The server device, the method for controlling the same, the program and the game system of the invention disclosed herein allow a player to be informed of the attractiveness of a group fighting event.

BRIEF DESCRIPTION OF THE FIGURES

FIG. 10 illustrates one exemplary method to deliver rewards according to the invention.

DETAILED DESCRIPTION

Figure 1:
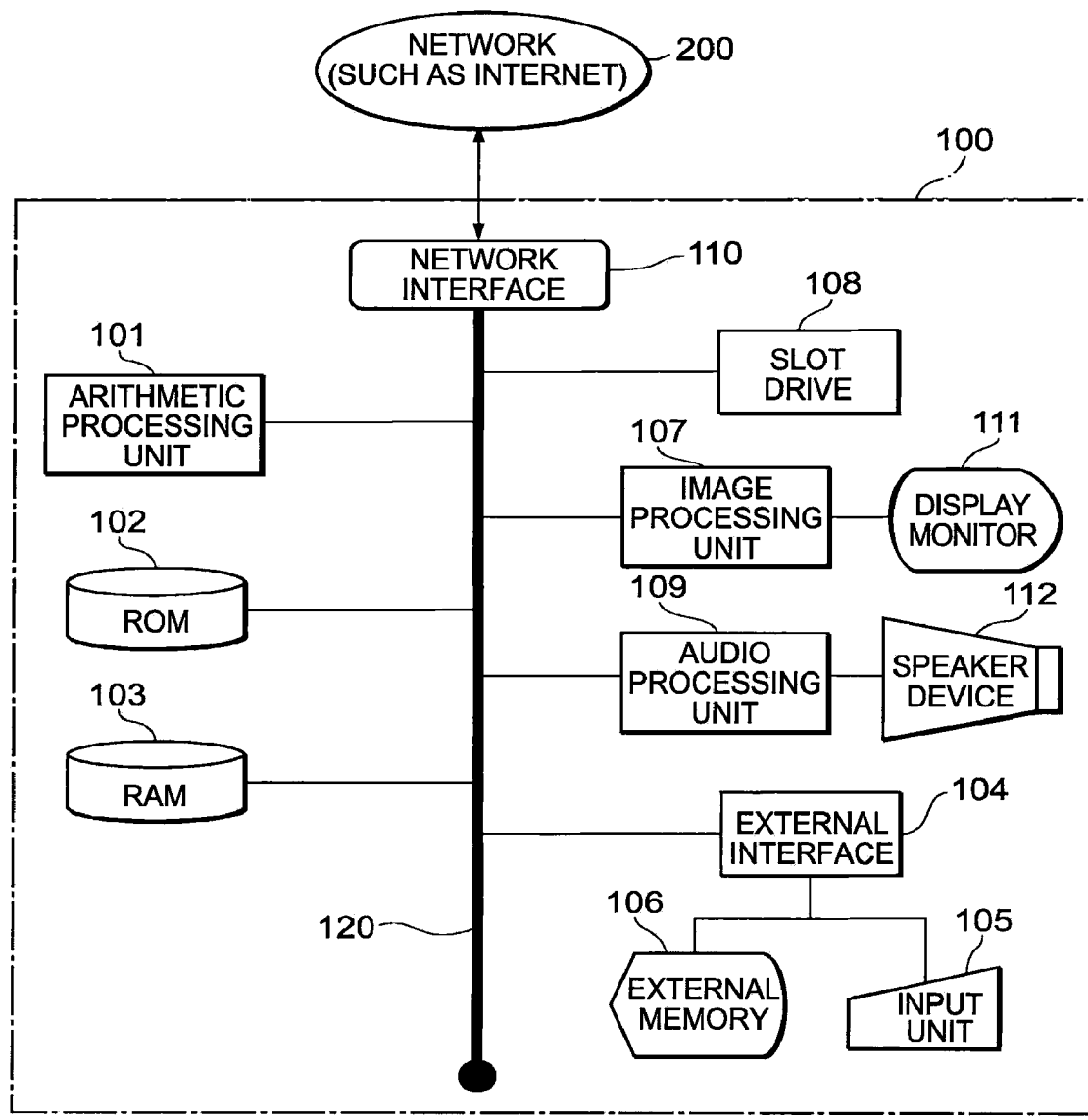
FIG. 1 schematically illustrates (system block diagram) the structure of a server device that is a preferred embodiment of the invention.

The following describes embodiments of the invention in detail. The following embodiments illustrate the invention for description, and are not intended to limit the invention to the embodiments only. The invention disclosed herein can be modified variously as long as its gist is not changed. A person skilled in the art can use embodiments that are obtained by replacing the following elements with their equivalents, and such embodiments also are included in the scope of the invention disclosed herein. The positional relationship such as vertical and horizontal described as needed is based on the illustration of the drawings unless otherwise designated. The ratios of the dimensions in the drawings are not limited to the illustrated one. The following exemplifies an embodiment of the invention disclosed herein by way of an information processing device for games for easy understanding, and the invention is not limited to this as stated above.

Figure 2:
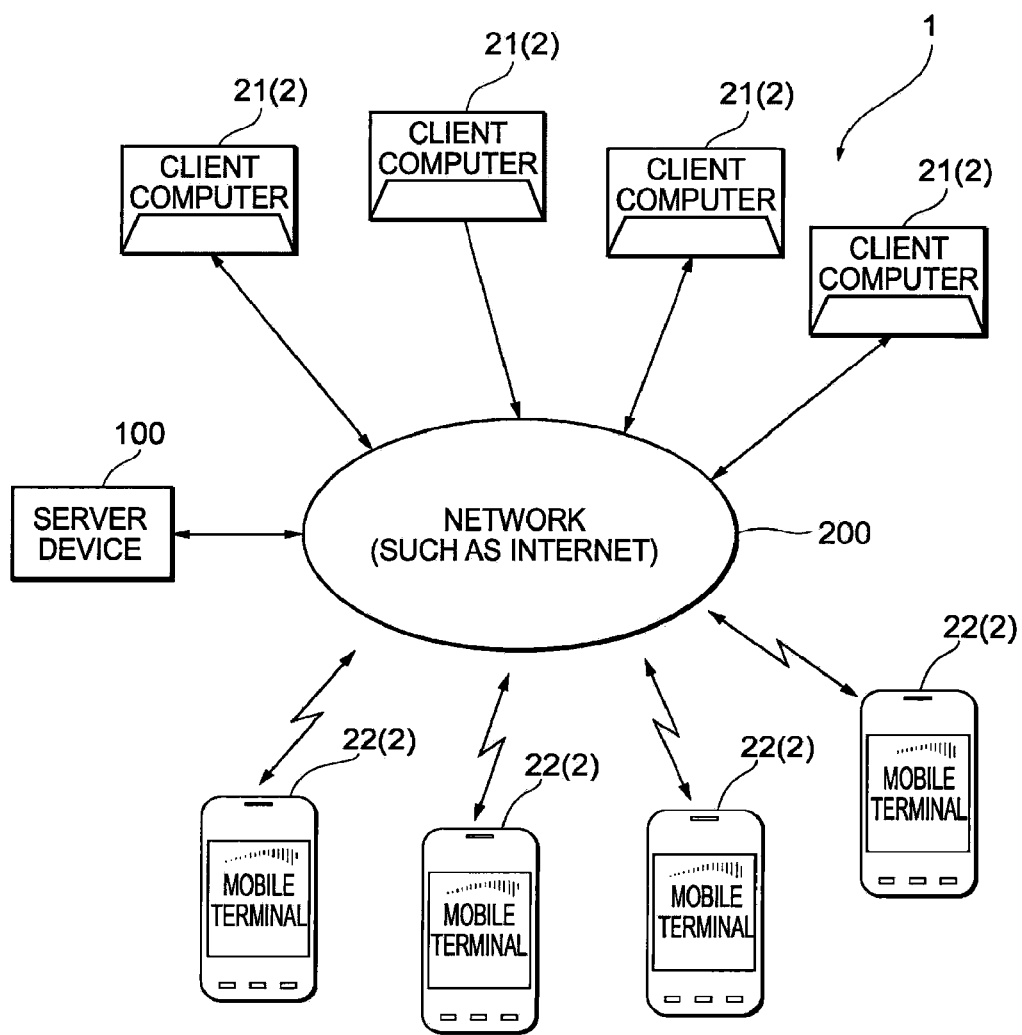
FIG. 2 schematically illustrates (system configuration diagram) the structure of a game system of the preferred embodiment.

FIG. 1 schematically illustrates (system block diagram) the structure of a server device that is a preferred embodiment of the invention disclosed herein. FIG. 2 schematically illustrates (system configuration diagram) the structure of a game system that is a preferred embodiment of the invention disclosed herein. As illustrated in these drawings, a server device 100 is a server computer that is connected to a network 200, and implements a server function through the operation of a predetermined server program in the server computer. The server device 100 and terminal devices 2 such as client computers 21 and mobile terminals 22 similarly connected to the network 200 in a wired or wireless manner are configured mutually-communicably, whereby a game system 1 is configured.

The network 200 is a communication line or a communication network relating to information processing including the Internet, for example. The specific configuration thereof is not limited especially as long as it is configured so as to enable exchange of data between the server device 100 and the terminal devices 2. For instance, the network 200 may comprise a base station that is wirelessly connected to a terminal device 2, a mobile communication network connected to the base station, the Internet connected to the server device, and a gateway device that connects the mobile communication network and the Internet.

The server device 100 comprises an arithmetic processing unit 101 such as a CPU or a MPU, a ROM 102 and a RAM 103 as storage devices, an external interface 104 connected to an input unit 105 and an external memory 106, an image processing unit 107 connected to a display monitor 111, a slot drive 108 containing or connected to a disk, a memory device or the like, an audio processing unit 109 connected to a speaker device 112, and a network interface 110, which are mutually connected via a transmission line 120 such as a system bas including an internal bas, an external bas, and an expansion bus. Devices for inputting/outputting such as the input unit 105, the external memory 106, the display monitor 111 and the speaker device 112 may be omitted as needed, and even when they are included, they may not be always connected to the transmission line 120.

The arithmetic processing unit 101 controls the overall operation of the server device 100, transmits/receives control signals and information signals (data) among the above-stated elements, and performs various types of arithmetic processing that is necessary for execution of a game. To this end, the arithmetic processing unit 101 is configured to be capable of performing, to a fast accessible storage area such as a register, arithmetic operations such as addition, subtraction, multiplication and division, logical operations such as logical OR, logical AND and logical NOT, and bit operations such as bitwise OR, bitwise AND, bit inversion, bit shift and bit rotation using an arithmetic logical unit as well as saturation calculation, trigonometric function calculation, vector calculation and the like as needed.

The ROM 102 contains an Initial Program Loader (IPL) recorded therein that is typically executed firstly after power activation. Following the execution of this IPL, a server program and a game program recorded in the disk or the memory device contained in or connected to the slot drive 108 is once read by the arithmetic processing unit 101 in the RAM 103, and such a program is executed by the arithmetic processing unit 101. The ROM 102 further contains a program of the operating system that is necessary for the overall operation control of the server device 100 and other various types of data recorded therein.

The RAM 103 is to temporarily store a server program, a game program, and various types of data. The RAM 103 holds the server program and the game program that are read as stated above and data necessary to advance a game or to establish a communication among a plurality of terminal devices 2, for example. The arithmetic processing unit 101 sets the range of variables for the RAM 103 and directly performs arithmetic operations using an arithmetic logical unit to values stored at the range of variables, or copies or moves the values stored in the RAM 103 to a register once for storage, directly performs arithmetic operations to the register and then writes the result of the operation back to the RAM 103.

The input unit 105 connected via the external interface 104 receives various operations for inputting that a user (provider of a game) of the server device 100 performs. The input unit 105 may comprise a keyboard, a touch pad or a touch panel as well as an audio input device, for example, and the types of the devices are not limited especially as long as it enables various operations for inputting, decision operations, cancel operations, input of instructions such as menu display and the like.

The RAM 103 and the external memory 106 that is connected detachably via the external interface 104 store data indicating operation states of the server device 100, access states of the terminal devices 2, and play states and progressing states (historical record and the like) of a game at each terminal device 2, a log (record) of communications among the terminal devices 2 and the like, which are stored in a rewritable manner.

The image processing unit 107 records various types of data in a frame memory or the like that are read from the slot drive 108 and are subjected to processing by the arithmetic processing unit 101 or the image processing unit 107 itself to be image information. Such image information recorded in the frame memory is converted into a video signal at a predetermined synchronizing timing, and is output to the display monitor 111 connected to the image processing unit 107. This enables display of various types of images. Image information relating to a game is sent out from the image processing unit 107 and/or the arithmetic processing unit 101 to each terminal device 2 by the cooperative processing with the arithmetic processing unit 101 and the like.

The audio processing unit 109 converts various types of data read from the slot drive 108 into audio signals, and outputs it from the speaker device 112 connected to the audio processing unit 109. Audio information (sound effects and song information) relating to a game is sent out from the audio processing unit 109 and/or the arithmetic processing unit 101 to each terminal device 2 by the cooperative processing with the arithmetic processing unit 101 and the like.

The network interface 110 is to connect the server device 100 to the network 200. The network interface 110 comprises an interface complying with various standards used for the configuration of a LAN, modems such as an analog modem, an ISDN modem, an ADSL modem and a cable model for connection to the Internet or the like using a cable television line, and the interface for connection of them to the arithmetic processing unit 101 via the transmission line 120.

Figure 3:
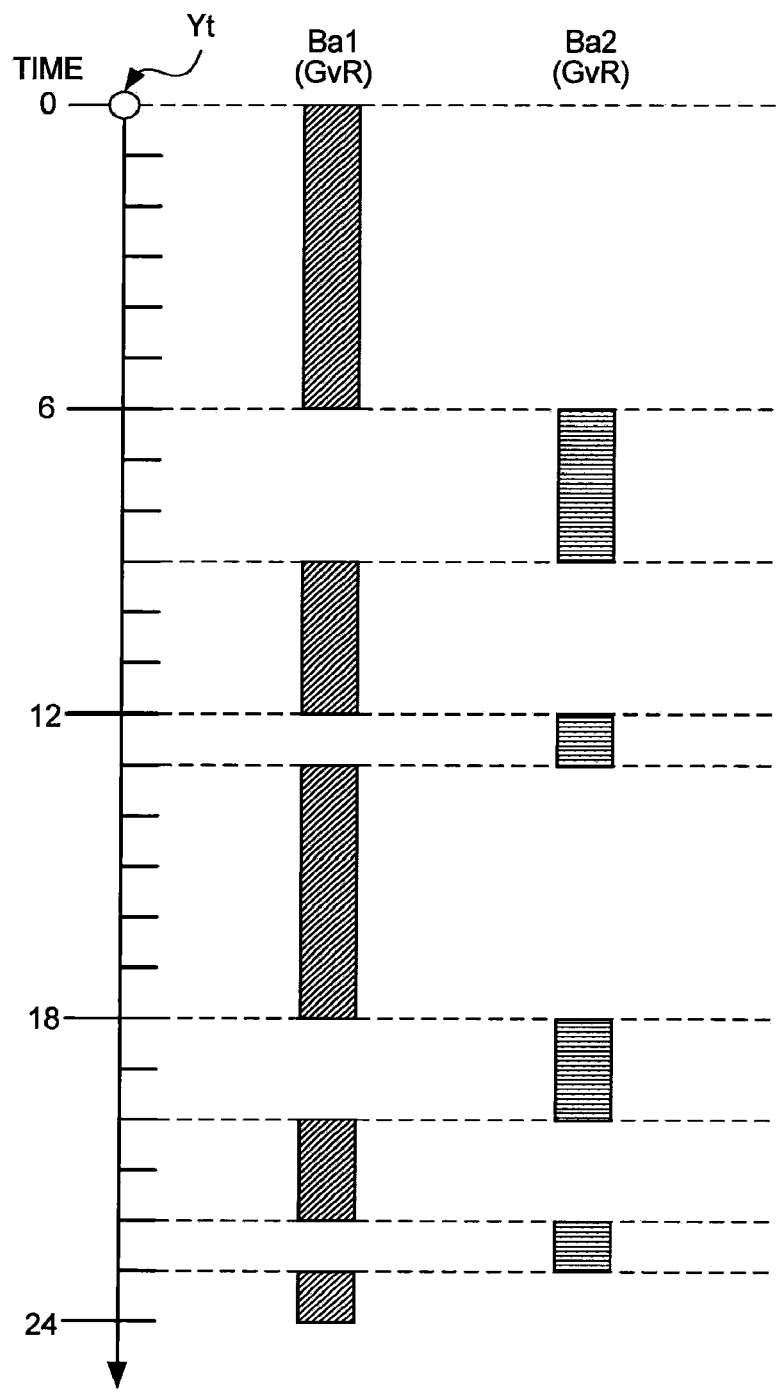
FIG. 3 is a conceptual diagram illustrating one exemplary time table of a game that is executed in the server device of FIGS. 1 and 2.
Figure 4:
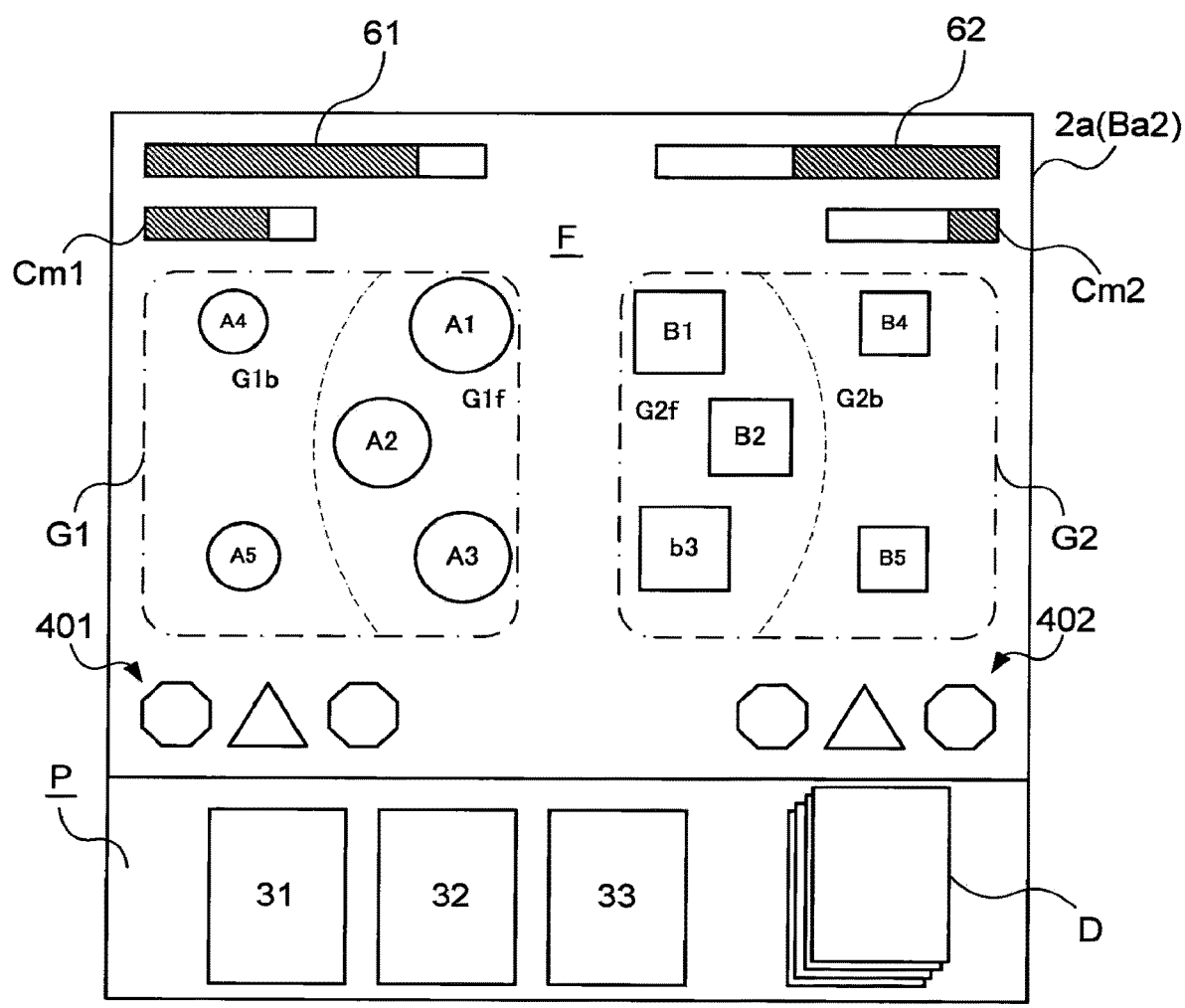
FIG. 4 schematically illustrates an exemplary configuration of a game screen in the game of FIG. 3.

The following describes a game (social game) that is executed in accordance with a game program of the invention disclosed herein in the thus configured game system 1 and server device 100. FIG. 3 is a conceptual diagram illustrating one exemplary time table of a game that is executed in the server device 100. FIG. 4 schematically illustrates an exemplary configuration of a game screen in the social game of FIG. 3.

Various types of processing (display of images and screens, determination, arithmetic operations and the like) in the following procedure are executed in accordance with a control instruction by the arithmetic processing unit 101 of the server device 100. That is, the arithmetic processing unit 101 functions as a "control unit" of the invention disclosed herein. The aforementioned ROM 102, RAM 103 and external memory 106 as well as various storage media recording information on the game therein correspond to an "information storage unit" of the invention disclosed herein.

This game comprises mutually different fighting events Ba1 and Ba2, and in the present embodiment, these fighting events Ba1 and Ba2 are continuously performed without interruption from 0 a.m. to 24 p.m. as shown in the temporal axis Yt in FIG. 3. The server device 100 is in a state capable of delivering these fighting events Ba1 and Ba2 to a terminal device 2 of a player in accordance with predetermined schedule and time-series algorithm.

The player operates a terminal device 2 (e.g., a client computer 21 or a mobile terminal 22 (tablet terminal, smartphone or the like)) to connect the terminal device 2 to the server device 100 via the network 200 such as the Internet. Then, the player operates the terminal device 2 to select this game provided from the server device 100, or inputs login information such as an ID number or a password at a platform screen shown prior to the selection of the game. When the arithmetic processing unit 101 of the server device 100 recognizes the login information, the terminal device 2 displays a my-page screen or a my-home screen specific to the player that is associated with the ID number. In some types of games, the my-page screen displays a banner including the list of a plurality of scenes (e.g., location, dungeon, quest and the like) that is set as a game scene. The scenes such as the location, the dungeon and the quest may be or may not be in the form of hierarchy mutually or as individual structures.

In the case of this game, the arithmetic processing unit 101 of the server device 100 displays, on the my-page screen or the my-home screen, a menu screen relating to the aforementioned "guild" that is a group to which individual players belong. A player who played the game before or have experience of participating in the game basically belongs to one guild, and information thereon is stored at an information storage unit such as the ROM 102 while being associated with specific information such as the ID information of the player. Based on the information, the arithmetic processing unit 101 then displays information on the guild to which the player belongs and an edit menu or the like relating to the guild as needed on the terminal device 2.

On the other hand, when the player plays the game for the first time or participates in the game for the first time or when the player wants to play the game alone, the player does not belong to a specific guild. Then, the arithmetic processing unit 101 displays a menu screen on the terminal device 2 of the player who does not belong to a guild to let the player to search for (retrieve) a guild or to create (establish) a new guild. The player operates the terminal device 2 in accordance with an instruction in a pull-down menu or the like that is successively displayed from the menu screen and so can decide or create a guild to participate in.

After deciding or selecting a guild to which the player belongs, a list of a plurality of games and events is displayed on the terminal device 2 as needed. When the player selects to participate in the game, the screen of a game event that is being performed at that time is displayed on the terminal device 2 of the player. This allows the player to freely participate in the game event that is being held at that time. At this time, the terminal device 2 of the player may display a preparation screen or an introduction screen of various types of game events, which may be a still image or a moving image (flash, for example).

As stated above, in one example shown in FIG. 3, the server device 100 always executes any one of the fighting events Ba1 and Ba2. For instance, in the case where the login time to the game is any one of from 0 a.m. to 6 a.m., from 9 a.m. to 12 a.m. (noon), from 1 p.m. to 6 p.m., from 8 p.m. to 10 p.m. and from 11 p.m. to 12 p.m. (0 a.m. in the next date), fighting event Ba1 is held in this game community. In the case where the login time to the game is any one of from 6 a.m. to 9 a.m., from 12 a.m. to 1 p.m., from 6 p.m. to 8 p.m., and from 10 p.m. to 11 p.m., fighting event Ba2 is held in this game community. In this way, the arithmetic processing unit 101 is configured to execute the processing of the fighting event Ba1 or Ba2 to be held in accordance with the predetermined schedule.

Between these fighting events Ba1 and Ba2, the fighting event Ba1 is a raid battle, i.e., a battle between guild G1 (group) to which the player belongs and a raid as an enemy player character (corresponding to the aforementioned GvR). On the other hand, the fighting event Ba2 is a guild battle, i.e., a battle between guilds G1 and G2 to which players belong (corresponding to the aforementioned GvG).

Referring to FIG. 4, one example of the fighting event Ba2 (GvG; guild battle) at the starting of the execution that is displayed on the terminal device 2 of each player is described below. The processing procedure of this fighting battle Ba2 (this may be called a quest, a turn or the like depending on game titles: the same applies to the fighting event Ba1) begins with defining an event field F and a pallet P as display areas of the game image on a screen 2a of the terminal device 2 and displaying elements thereof at these display areas.

Specifically player characters A1 to A5 belonging to guild G1 and player characters B1 to B5 belonging to guild G2 are displayed as a part of the elements. That is, in this case, an area where player characters A1 to A5 belonging to guild G1 are displayed (main field of guild G1) and an area where player characters B1 to B5 belonging to guild G2 are displayed (main field of guild G2) are mainly defined at the event field F. Then player characters A1 to A5 belonging to guild G1 and player characters B1 to B5 belonging to guild G2 each join together to fight a direct battle with opponent player characters of the opponent guilds.

The main fields of guilds G1 and G2 are made up of sub-fields G1f and G1b and sub-fields G2f and G2b, respectively, which are surrounded with dot-and-dash lines in the drawing. In this embodiment, among player characters A1 to A5 belonging to guild G1, three player characters A1 to A3 are arranged at sub-field G1f as forward players and the other player characters A4 and A5 are arranged at the sub-field G1b as back players based on the values of parameters (see FIG. 5) set for the player characters A1 to A5. Similarly, among player characters B1 to B5 belonging to guild G2, three player characters B1 to B3 are arranged at sub-field G2f as forward players and the other player characters B4 and B5 are arranged at the sub-field G2b as back players based on the values of parameters set for the player characters B1 to B5.

The game is configured so that, for both of the above guilds G1 and G2, the player characters as forward players only receive a damage by an attack from the opponent player characters, and both of the forward and back player characters can participate in attacks.

In the form of the fighting at this fighting event Ba2, the screen 2a of each terminal device 2 of player characters A1 to A5 in guild G1 shows pallet P. This pallet P is a place where each player character A1 to A5 and B1 to B5 in guilds G1 and G2 decides their "weapons" (normal weapons and special weapons) by random drawing that can be used for attacking of opponent player characters B1 to B5 and A1 to A5 as their elements. This pallet P displays a deck D that is a virtual bundle of cards and a plurality of cards (game media) selected from the deck D.

Each card includes a type of the "weapon" or a player character representing it, and a specific item, illustration and letters relating to the weapon that are drawn or described thereon. Each card contains information set therefor, including the weapon, the attack rate (a point of the weapon or activated action; action point (AP) or weapon point (weapon P)), the defense rate (this may be health or hit point (HP)), attributes (e.g., colors such as red, green and blue and forms such as fire, water, trees and light), the degree of rareness (rarity) and the like. When the player turns over the cards one by one from the deck D and if three cards 31, 32 and 33 displayed have only one type, attribute or the degree of rareness or have a specific combination (pat), the effect such as increasing the attack power and the defense power of player A1 to A5 will be activated. Then, the weapon that is to be activated by the selection or the combination of cards 31, 32 and 33 or their related items being executed 401 and 402 are displayed below the player characters A1 to A5 and B1 to B5, respectively, at the event field F.

In the state where the three cards 31, 32 and 33 are displayed at the pallet P, when the player further turns over a card from the deck D, then any one of the cards 31, 32 and 33 (e.g., the card 31 on the left in the drawing) will be removed from the screen 2a, and the newly selected card will be displayed. At this time, the display may be adapted so that the card 31 to be deleted is slid out to the outside of the pallet P, for example, the remaining cards 32 and 33 are slid to the left, and the new card is slid into the empty space.

When each player character A1 to A5 in guild G1 selects (turns over) cards one by one from the deck D at the pallet P, a damage done to the opponent and a damage that the player receives can be calculated in accordance with the combination of the weapons, attack rates, specific items and defense rates as well as their attributes, degrees of rareness and the like set for the cards 31, 32 and 33 when the player attacks player characters B1 to B3 of the opponent guild G2. On the other hand, a similar display is shown on the screen 2a of each terminal device 2 of player characters B1 to B5 of guild G2 as well, and they attack player characters A1 to A3 of the opponent guild G1.

HP gauges 61 and 62 for guilds G1 and G2 are displayed above the main field of guilds G1 and G2, respectively. Then the number of times player character A1 to A5, B1 to B5 attacks their opponent player characters continuously (the number of combos) before receiving an attack from the opponent player characters B1 to B5, A1 to A5 is displayed as combo gauges Cm1 and Cm2 in the vicinity of the HP gauges 61 and 62, respectively. When the number of combos displayed in these combo gauges Cm1 and Cm2 reaches a predetermined value or more, the power of a weapon used for the opponent player characters B1 to B5, A1 to A5 by player character A1 to A5, B1 to B5 is enhanced, whereby a damage to be done to the opponent player characters increases. Then, the winner or the loser will be determined based on the values of the HP gauges 61 and 62 at the ending time of the fighting.

As stated above, the players belong to guilds G1 and G2, for example, in principle to execute fighting events Ba1 and Ba2. On the other hand, the following exemplifies the case where player C1 who does not belong to any guild (hereinafter called a not-belonging player) watches a fighting event Ba2 and then participates in fighting event Ba2 based on the screen display observed. Such a not-belonging player C1 is allowed to participate in fighting event Ba2 under a certain constraint. The certain constraint may be added to the behavior at fighting event Ba2 or may be added to rewards that the player can obtain after fighting event Ba2 ends. Specifically, the certain constraint of the present embodiment is to limit the behavior so that the player is allowed to act as a back player only at fighting event Ba2 and is not allowed to support the attacks, and is to limit the rewards given to the player compared with players belonging to the guild (the details are described later). The certain constraint is not limited to this, and other any limitations may be set. Although the present embodiment describes the case of adding a certain constraint, such a certain constraint may not be provided within a certain period, for example, to allow the not-belonging player C1 to enjoy the fighting event Ba2 similarly to other player characters.

Figure 5:
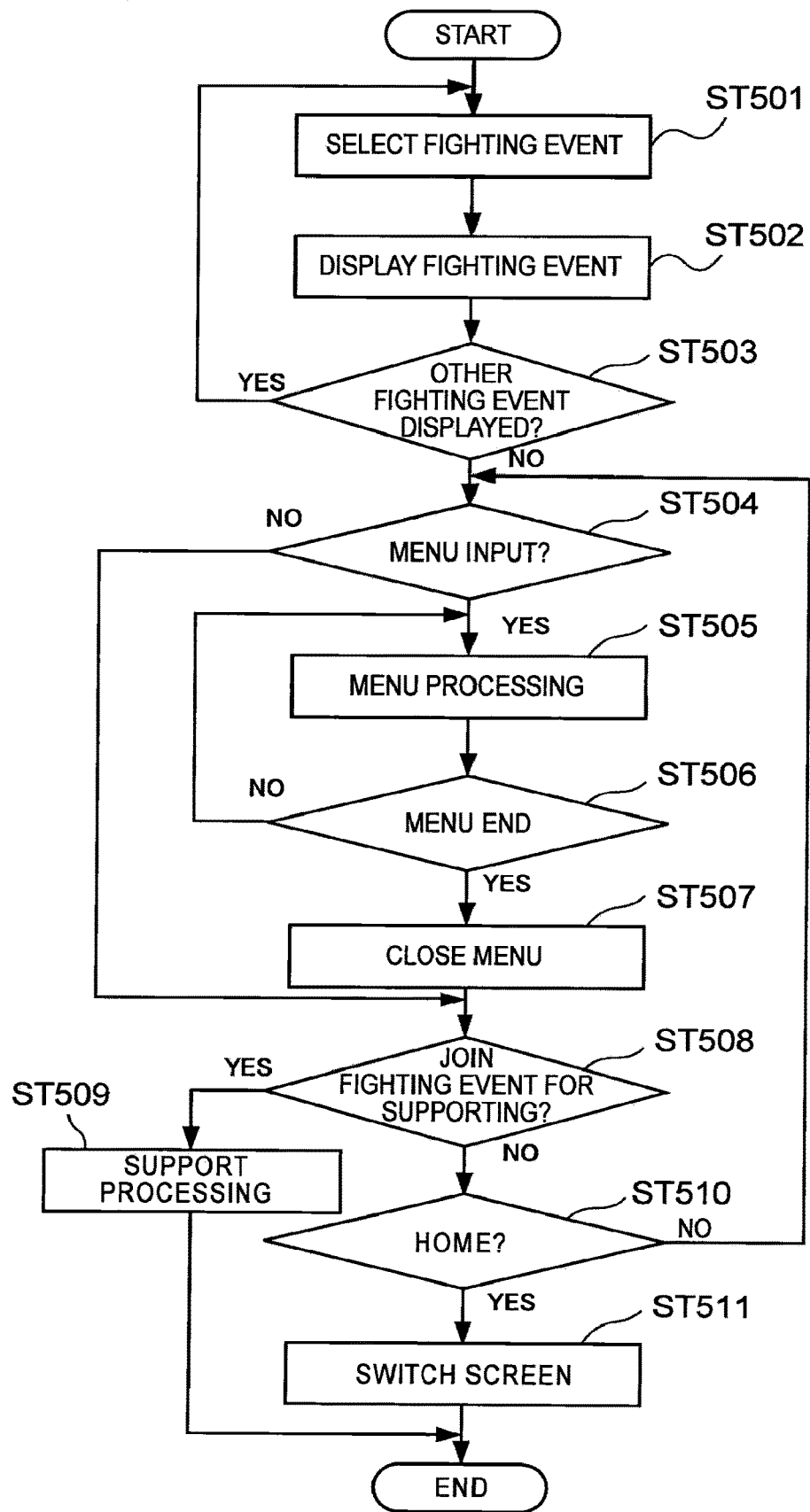
FIG. 5 is a flowchart illustrating one exemplary processing to support a fighting event according to the invention.

FIG. 5 is a flowchart illustrating one exemplary processing to support (participate in) fighting event Ba2. This processing starts when the not-belonging player C1 operates the terminal device 2 to switch the display from the top screen to the my-home screen to provide the present game, and to input through a watch button (not illustrated) to watch fighting event Ba2, for example.

Firstly the arithmetic processing unit 101 selects fighting event Ba2 among a plurality of fighting events Ba2 being currently executed that is to be displayed on the terminal device 2 (ST501). In the present embodiment, letting that the not-belonging player C1 manipulates a player character at a certain level (first level), this selection is performed at random from fighting events Ba2 that are at a level (second level: the average of levels of the player characters in opposed guilds is within a predetermined range relative to a first level) that is close to the first level. If any fighting event Ba2 is not executed, an error will be displayed at the terminal device 2.

When a fighting event Ba2 is selected as stated above, then the arithmetic processing unit 101 performs processing to display the fighting event Ba2 at the terminal device 2 (ST502). For instance, the terminal device 2 displays, as information on the fighting event Ba2, a fighting event between guilds G1 and G2 as described referring to FIG. 4, and displays a banner to describe information on the fighting event Ba2 in details.

Figure 6:
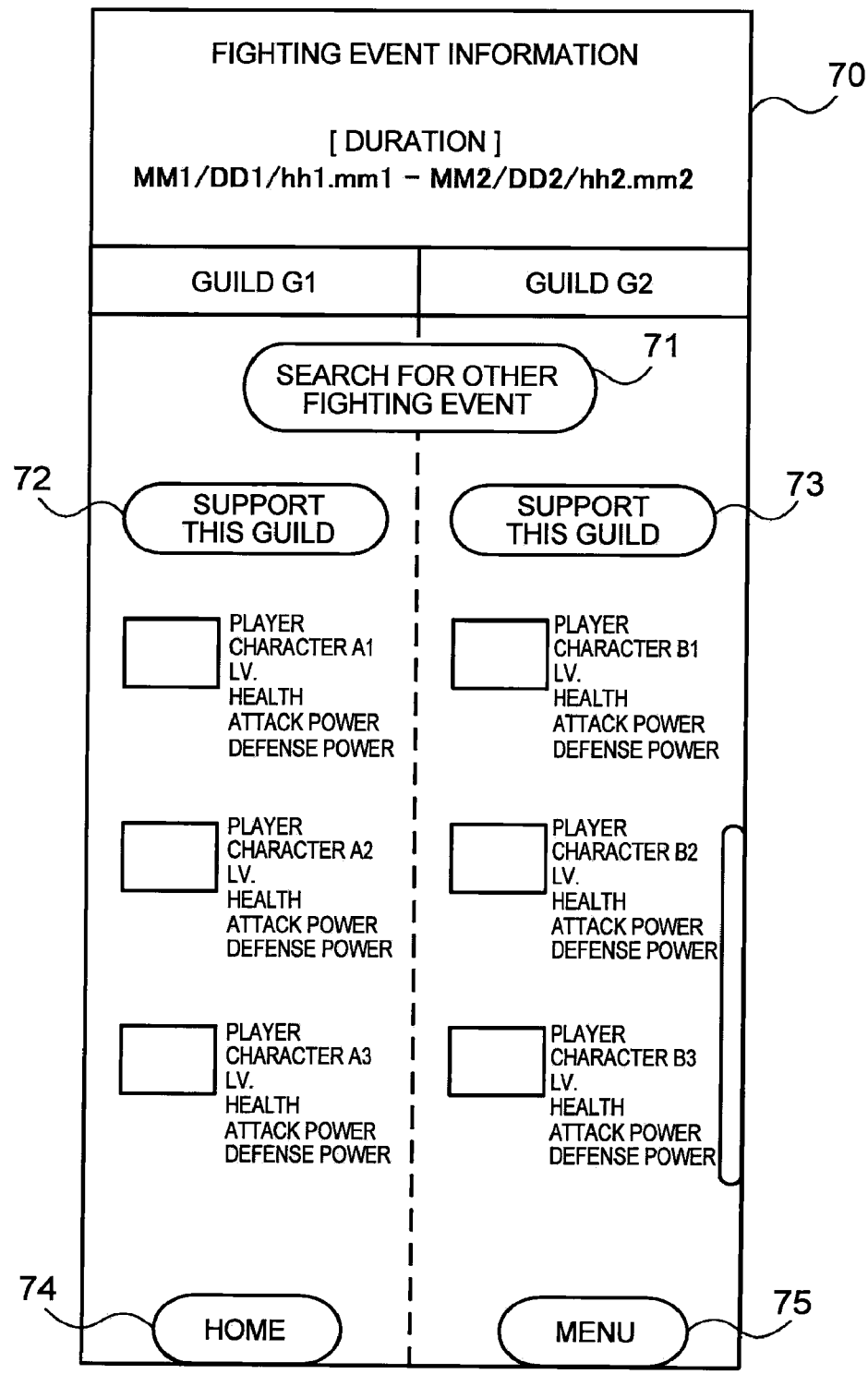
FIG. 6 illustrates one exemplary display during the processing to support a fighting event that is displayed on the game screen of a terminal device.
Figure 7:
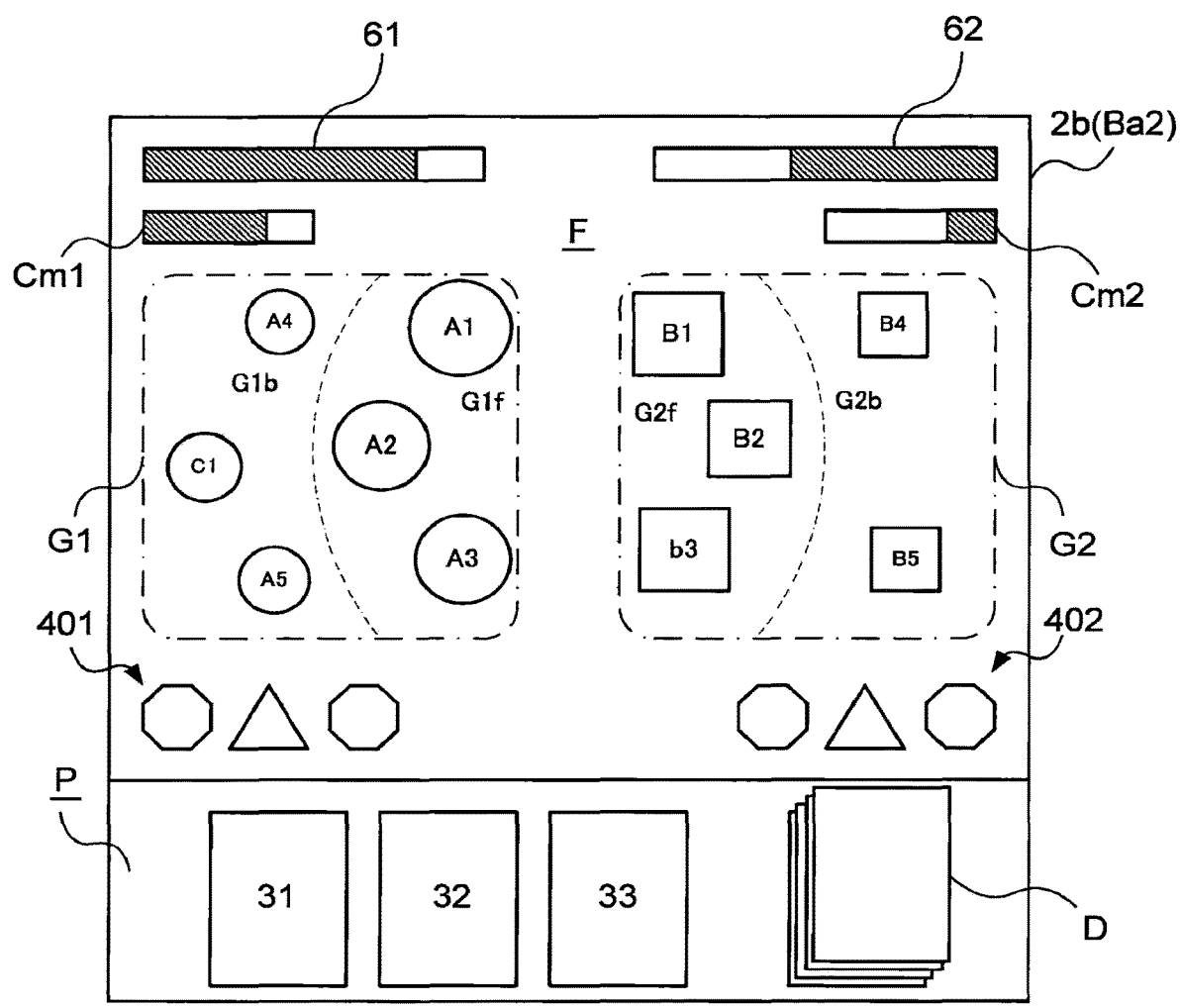
FIG. 7 schematically illustrates an exemplary game screen during the processing to support a fighting event.

Referring now to FIG. 6, the following describes one example of the banner display 70. The banner display 70 is to display information on the name of fighting event "fighting event Ba2", duration of the fighting event "MM1/DD1/hh1.mm1-MM2/DD2/hh2.mm2", the names of fighting guilds "guild G1" and "guild G2", the names of player characters of both of guilds G1 and G2 and their parameters "player characters A1" to "player character A5" and "player character B1" to "player character B5". All of the player characters displayed on the banner display 70 can be checked by scrolling the display. The banner display 70 further displays a "search for other fighting" button 71 to display other fighting event Ba2, "support this guild" buttons 72 and 73, which are displayed at areas of guilds G1 and G2, respectively, to support the corresponding guilds, a "home" button 74 to return to the my-home screen, and a "menu" button 75 to display a menu to execute various types of processing. The not-belonging player C1 sees the banner display 70 and is allowed to visually check information on the player characters belonging to both of the guilds G1 and G2 to perform the fighting events Ba2.

For instance, when the not-belonging player C1 presses the "menu" button 75, a menu is displayed. When the not-belonging player C1 then inputs at a certain button, then detailed information on the total power of the overall guild of each of guilds G1 and G2 is displayed. Herein, the total power of the overall guild includes, for example, an attack power, a defense power, health, skills that the overall guild has, the existence of players, battle records (battle record of today, battle record of one week, battle record of one month and battle record of one year), the number of beaten bosses, the level of the boss that is beaten the most recently, a time period to beat the boss, attributes of the beaten boss and the like. Together with or separately from the display of them, an incentive as a point that will be given to players belonging to a guild (the details will be described later referring to FIG. 10) also can be displayed. Then the not-belonging player C1 can decide to which guild he/she is to support (participate in) favorably at the fighting event Ba2 based on the displayed information on the total power of the guilds.

The display of an incentive allows the not-belonging player C1 to visually understand a big advantage that can be obtained by belonging to a guild. The present embodiment describes the case where the banner display 70 mainly displays information on the individual player characters by default, and displays the information on the total power of the overall guilds and incentives via a menu, and the invention disclosed herein is not limited to this. For instance, by default the banner display 70 may display the detailed information on the total power of the overall guilds and incentives, and may display information on the individual player characters via a menu.

Referring back to FIG. 5, the processing continues as follows. The arithmetic processing unit 101 performs the following processing in response to inputs at various buttons displayed on the banner display 70.

The arithmetic processing unit 101 determines whether or not to display other fighting event Ba2 based on whether input is performed or not at the "search for other fighting" button 71 (ST503). When it is determined that other fighting event Ba2 is to be displayed (ST503: YES), the procedure returns to Step S501, where other fighting event Ba2 is selected from the aforementioned predetermined range (ST501), and the terminal device 2 displays information on the other fighting event Ba2 (ST502).

Then the arithmetic processing unit 101 determines whether or not to display a menu based on whether input is performed or not at the "menu" button 75 (ST504). When it is determined that a menu is to be displayed (ST504: YES), the arithmetic processing unit 101 displays a menu and performs processing based on an instruction on the menu, for example (ST505). Next, the arithmetic processing unit 101 determines whether input is performed or not at an end button (not illustrated). When it is determined that input is performed at the end button (ST506: YES), the arithmetic processing unit 101 closes the menu (ST507).

Then the arithmetic processing unit 101 determines whether or not to make player C1 support a fighting displayed on the terminal devices 2 based on whether input is performed or not at the "support this guild" buttons 72 and 73 (ST508). When input is performed at the "support this guild" button 72, the arithmetic processing unit 101 performs processing to make the player C1 support (participate in) the guild G1. Alternatively, when input is performed at the "support this guild" button 73, the arithmetic processing unit 101 performs processing to make the player C1 support (participate in) the guild G2. Then the arithmetic processing unit 101 displays a player character of the player C1 as a back player of the fighting event Ba2 to allow the player to participate in the fighting event Ba2 as a back player, thus ending the supporting processing and closing the banner display 70. This can display the player character of the player C1 at the sub-field G1b of the guild G1 of the fighting event Ba2, for example, to attack the player characters of the guild G2 and so to support the guild G1.

Then the arithmetic processing unit 101 determines whether input is performed at the "home" button 74 or not (ST509). When it is determined that input is performed at the "home" button 74 (ST510: YES), the arithmetic processing unit 101 switches the display of the terminal device 2 into the my-home screen (ST511), and ends this processing.

Figure 8:
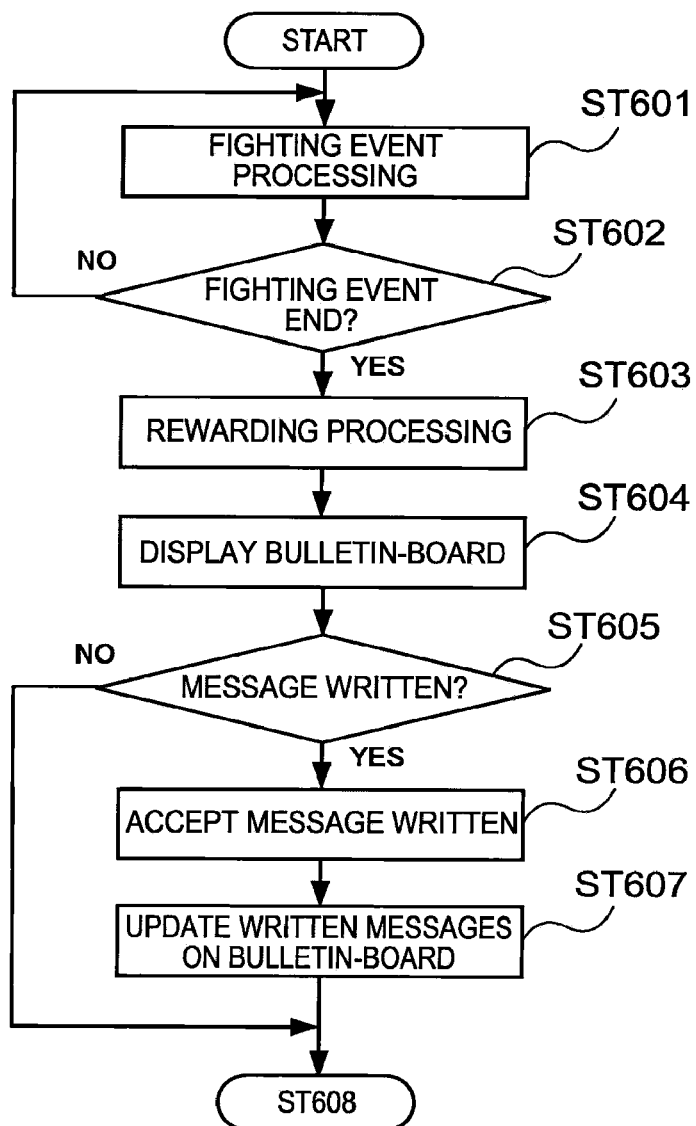
FIG. 8 is a flowchart illustrating a part of one exemplary processing to be performed when the fighting event ends according to the invention.
Figure 9:
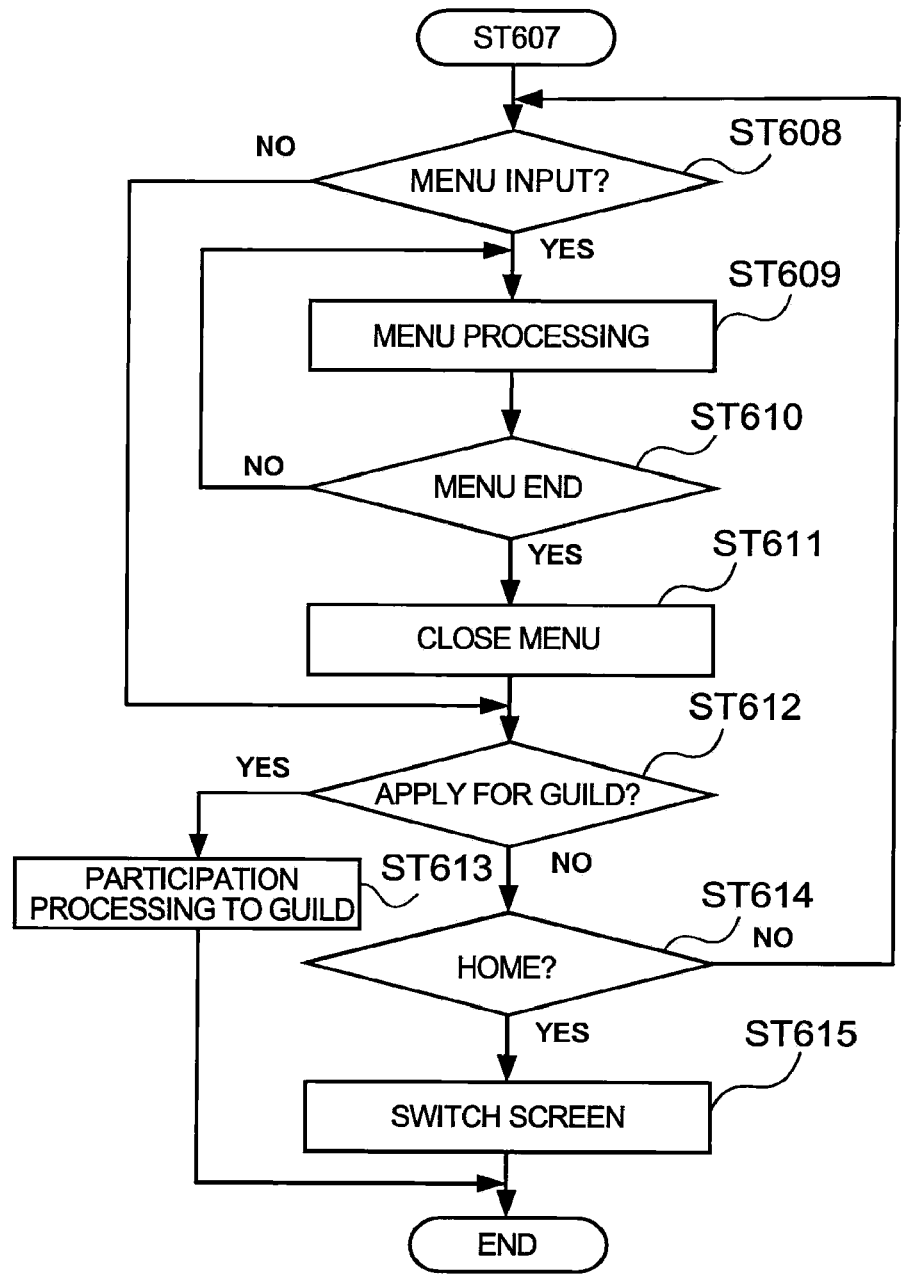
FIG. 9 is a flowchart illustrating the remaining part of the exemplary processing of FIG. 8.

Next, the following describes the processing to be performed when the fighting event Ba2 ends. FIGS. 8 and 9 are flowcharts to illustrate one exemplary processing to be performed at the end of the fighting event Ba2.

The arithmetic processing unit 101 determines whether the fighting ends or not during the fighting event processing (ST601) of the fighting event Ba2 (ST602). Since the duration to hold the fighting event Ba2 is set as stated above, the arithmetic processing unit 101 makes this determination based on whether it is a time for the ending time of the fighting event Ba2 or not. This determination can be said a determination whether the winner or loser of the fighting event Ba2 is decided or not.

When it is determined that the fighting event processing ends (ST602: YES), the arithmetic processing unit 101 performs rewarding processing (ST603). The rewarding processing of the present embodiment is to deliver rewards as points to each of the player characters A1 to A5, B1 to B5 and C1 who participated in the fighting event Ba2. Rewards include a basic point, to which an incentive is additionally given in accordance with a certain rule. As illustrated in an incentive setting table T1 of FIG. 10, the following incentives are given to the players, for example, i.e., a basic point +30% will be given to a player character belonging to a guild, a basic point +50% will be given to a player character belonging to the guild that won in the fighting, and a basic point +20% will be given to a player character that is arranged as a forward player at the time of the fighting ending. Specifically a player character belonging to the guild that won in the fighting and being arranged as a forward player will receive a basic point +100% (i.e., basic point ·2). On the other hand, a player character (player C1) that does not belong to a guild and being arranged as a back player of the guild that won in the fighting will receive basic point +50% (i.e., basic point −1.5). When the guild, to which the player C1 participated in for supporting, loses, the player C1 will receive the basic point only. In this way, it is set so that the player C1 who does not belong to a guild and participates in a guild for supporting as a back player will receive an incentive only when the guild wins in the fighting, and a player character who belongs to a guild will receive more points.

When the delivery of rewards ends as stated above, the arithmetic processing unit 101 performs bulletin-board displaying processing (ST604). A bulletin-board is provided for a communication between players who participate in the fighting event Ba2, and is provided for each fighting event (guild battle). A bulletin-board provided for each fighting event is configured to be accessible by each player who participated in the fighting event during duration (from 9 a.m. to 12 a.m.) from the end of the fighting event Ba2 (from 6 a.m. to 9 p.m.) to the starting of the next fighting event Ba2 (from 12 a.m. to 1 p.m.) via their terminal devices 2.

Figure 11:
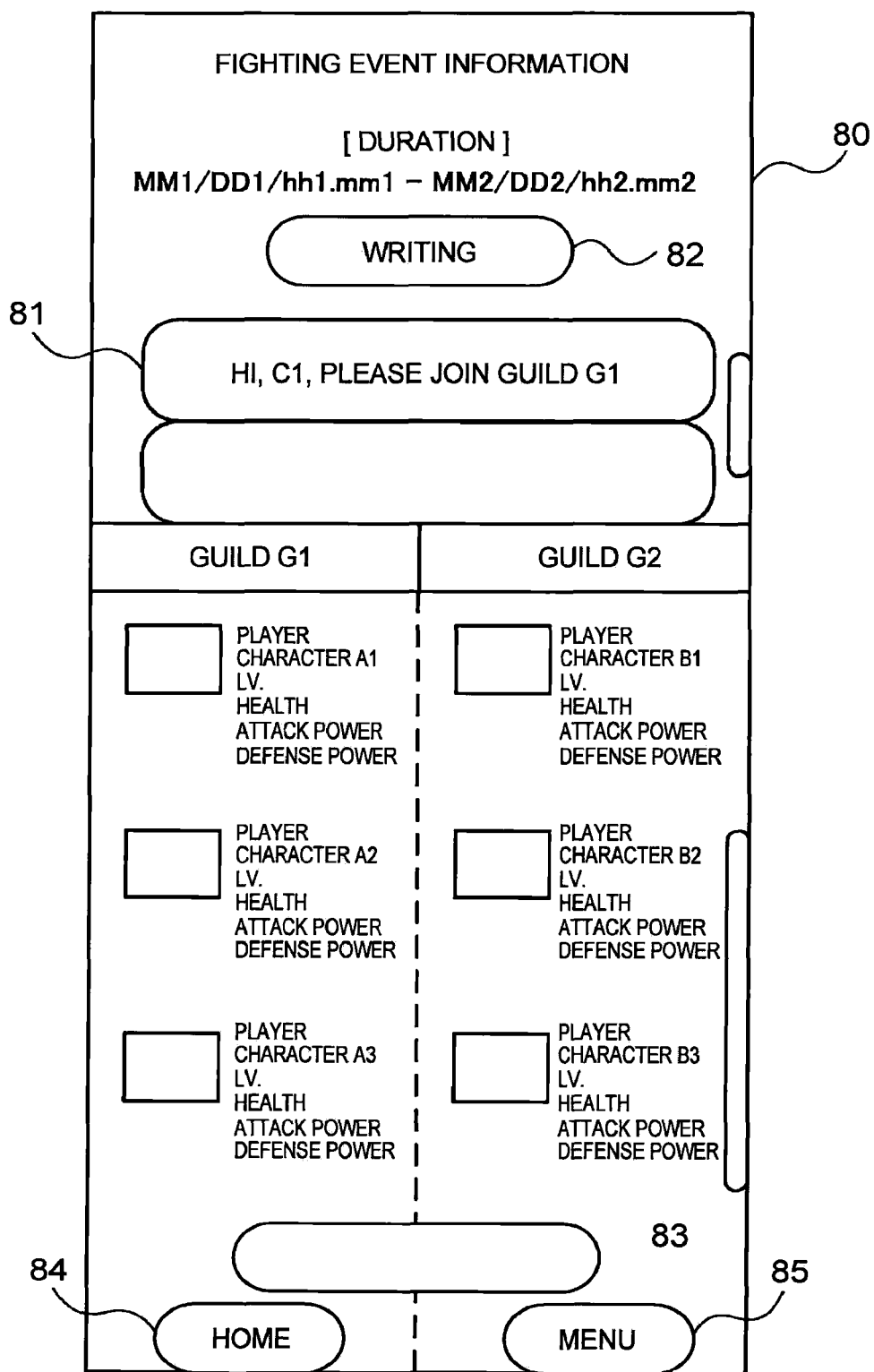
FIG. 11 illustrates one exemplary display of a bulletin-board that is displayed on the game screen of a terminal device.

FIG. 11 illustrates one example of the bulletin-board (hereinafter this may be called a banner display) 80 displayed at the terminal device 2. The banner display 80 displays information on the name of fighting event "fighting event Ba2", duration of the fighting event "MM1/DD1/hh1.mm1-MM2/DD2/hh2.mm2", the names of fighting guilds "guild G1" and "guild G2", messages 81 from players who participated in the fighting event, the names of player characters of both of the guilds G1 and G2, and their parameters "player characters A1" to "player character A5" and "player character B1" to "player character B5". All of the contents of messages and the parameters of the player characters displayed on the banner display 80 can be checked by scrolling the display. The banner display 80 further displays a "writing" button 82 for writing of a message, an "apply for participation in guild" button 83 to apply for participation in a guild, a "home" button 84 to return to the my-home screen, and a "menu" button 85 to display a menu to execute various types of processing. Similarly to the above-mentioned banner display 70, the bulletin-board 80 also is configured so as to display the information on the total power of the overall guilds of the guilds G1 and G2 and incentives via a menu that is displayed by pressing the "menu" button 85, and alternatively the bulletin-board 80 may display the detailed information on the total power of the overall guilds and incentives by default and may display information on the individual player characters via a menu.

Referring back to FIG. 8, the following describes the processing again. The arithmetic processing unit 101 performs the following processing in response to input at various buttons.

The arithmetic processing unit 101 determines whether or not to display a banner, i.e., whether a message is to be written at the bulletin-board 80 or not based on whether input is performed or not at the "writing" button (ST605). When it is determined as writing (ST605: YES), the arithmetic processing unit 101 accepts the writing for inputting from each player at their terminal devices 2 (ST606). Then the arithmetic processing unit 101 adds information on the writing based on the accepted contents of the writing and updates the message 81 on the bulletin-board 80 (ST607).

Then the arithmetic processing unit 101 determines whether or not to display a menu based on whether the "menu" button 85 is input or not (ST608), and executes processing based on the menu display (ST609 to ST611). Since the processing from Step ST608 to ST611 is similar to the processing from Step ST504 to ST507 of FIG. 5 as stated above, their detailed descriptions are omitted.

Then the arithmetic processing unit 101 determines whether or not to perform participation (belonging) processing to a guild based on whether the "apply for participation in guild" button 83 is input or not (ST612). When it is determined to perform the participation processing to a guild (ST612: YES), the arithmetic processing unit 101 performs the participation (belonging) processing to a guild (ST613). Specifically, the arithmetic processing unit 101 displays a screen as a popup to inquire the terminal device 2 operated by the player C1 as the origination of the application about in which guild he/she wants to participate, for example. Then, the arithmetic processing unit 101 understands the guild that the player C1 applies for participation based on the input to the popup display, and performs processing to allow the player character of the player C1 to belong to the guild. When the player C1 participates in the guild, terminal devices 2 of other players of the guild may be informed as such.

The arithmetic processing unit 101 further determines whether input is performed or not at the "home" button 84 (ST614). When it is determined that input is performed at the "home" button 84 (ST614: YES), the arithmetic processing unit 101 switches the display of the terminal device 2 to the home screen (ST615), and ends this processing.

The thus configured server device 100, method for controlling the same, computer-readable recording medium having stored thereon a game program, and game system 1 allow the player C1 to watch fighting event Ba2 between guilds G1 and G2, and so diversity can be added to enjoyment brought by participating in the game, and the player C1 can be informed of the attractiveness of the group fighting event.

If the player C1 wants to support any one of the guilds G1 and G2 at the fighting event Ba2 that he/she watches, input may be performed at the "support this guild" buttons 72 and 73 that are displayed at the banner display 70, whereby the player C1 can participate in the fighting event Ba2 (support one of the guilds). This allows the player C1 to experience the fighting event Ba2, and when supporting the guild G1, he/she can actually experience the enjoyment brought by fighting the guild G2 together with other player characters A1 to A5.

After the fighting event Ba2 ends, the bulletin-board 80 is displayed for each fighting (guild battle) at the terminal devices 2 of the players who participated in the fighting event Ba2. Using this bulletin-board 80, the players fighting together can communicate with each other, and so the players belonging to the guilds G1 and G2 can solicit the not-belonging player C1 to their guilds, for example. Through such a communication, the player C1 can be informed of the attractiveness of the group fighting event.

The above embodiment describes the case where the player C1 who does not belong to the guild supports the guild G1, and the invention disclosed herein is not limited to this. For instance, the player who belongs to a guild may watch (display) a fighting event Ba2 of another guild.

The above embodiment describes the case where any limitation is not placed on the number of players who can participate in the fighting event Ba2 for supporting, and as the average value of the levels of the player characters who participate in the fighting event Ba2 increases, limitation may be placed so as to decrease the number of players who are allowed to participate therein for supporting. For instance, it may be set so that the number of players who can participate in for supporting is three when the average value of the levels is at the levels 1 to 10, two at the levels of 11 to 20 and only one at the levels of 21 to 30, and no one is allowed to support at the levels of 31 or more. It is better to place such limitation in the number of players, because, in the case of a fighting event, it is not preferable for a player who is unfamiliar with the game to participate in the game performed at a higher level.

As stated above, the invention disclosed herein is not limited to the above embodiment and the already-described modified examples, and may be modified variously as long as its gist is not changed. For instance, the configuration of the server device 100 illustrated in FIG. 1 may be applied to the client computers 21 and the mobile terminals 22 as the terminal devices 2 as well, which are different in ability in processing or the like. In other words, a client computer 21 or a mobile terminal 22 may be used as the server device 100. That is, any computer that is connected via the network 200 may function as the server device.

The server device 100 may comprise a mass-storage device such as a hard disk or a SSD, which is configured so as to fulfill the functions similar to the ROM 102, the RAM 103, the external memory 106, a memory device loaded in the slot drive 108 and the like. Such a storage device may or may not have a redundant architecture using RAID or the like. This may not be connected to the arithmetic processing unit 101 via the transmission line 120, and may be connected to another external device via the network 200 as a part of cloud computing, for example.

A network interface at the server device 100 and the terminal devices 2 may be a wireless LAN device or a wired LAN device, which may be installed internally or may be of an external device type such as a LAN card. The terminal devices 2 may be a game console that can be connected to the network 200 or may be an online karaoke device, for example.

As described above, the server device, the method for controlling the same, the computer-readable recording medium and the game system of the invention disclosed herein can greatly improve the amusement, the attractiveness and the variety, and so can promote activation of a fighting event and accordingly general games, and can develop the feeling of a player to participate in or continue the game. In this way, the invention disclosed herein can be used widely and effectively for general games that are delivered, provided and executed especially in the server-client type network configuration (especially including elements of a social game), general techniques relating to software and hardware for the delivery, provision and execution of the games, and the actions of their designing, manufacturing, sales and the like.

What is claimed is:

1. A server device that provides a game, in which a plurality of players can participate, and that is connected to terminal devices operated by the players via a communication line, comprising:
   an information storage unit; and
   a control unit that accesses the information storage unit to perform processing to display an image of the game at the terminal devices, wherein
   the information storage unit stores information on a group fighting event of the game,
   the control unit performs processing to provide the group fighting event such that a first group, a second group, and one or more participants who do not belong to a group that is engaged in the group fighting event participate in the group fighting event, wherein the group fighting event further includes at least one watcher who does not fight during at least one portion of the group fighting event;
   wherein when the group fighting event ends, the control unit displays a bulletin-board at terminal devices of players who fought in the group fighting event, said players including at least players in the first group, players in the second group, and the one or more participants, the bulletin-board enabling a communication among the players.

2. The server device according to claim 1, wherein the bulletin-board displays, on a terminal device of one of the one or more participants, a graphical user interface element that is configured to send an application to at least one of the first group or the second group when activated.

3. The server device according to claim 1, wherein the control unit is configured to display the bulletin-board for a time period from an end of the group fighting event to a beginning of a second group fighting event.

4. The server device according to claim 3, wherein each of the group fighting event and the second group fighting event has a scheduled duration.

5. The server device according to claim 1, wherein the bulletin-board displays a power ranking for each of the first group and the second group.

6. The server device according to claim 5, wherein the power ranking comprises at least one of the set of: a guild attack power, a guild defense power, a guild battle health, a guild available skill, a guild membership roster, a guild battle record, and guild boss battle information.

7. The server device according to claim 1, wherein the bulletin board displays a listing of members of each of the first group and the second group, and is configured to display, via a menu, information on each member in the listing of members.

8. The server device according to claim 1, wherein the bulletin-board displays a membership incentive for the first group and the second group.

9. The server device according to claim 1, wherein the control unit performs processing to provide the group fighting event such that the one or more participants are restricted to a predetermined level range.

10. The server device according to claim 1, wherein the control unit performs processing to provide the group fighting event such that the one or more participants participate in attacks in a second position tier, and such that the one or more participants are restricted from entry into a first positional tier.

11. A method for controlling a server device that provides a game, in which a plurality of players can participate, and that is connected to terminal devices operated by the players via a communication line, the server device comprising an information storage unit, and a control unit that accesses the information storage unit to perform processing to display an image of the game at the terminal devices, the method comprising:
   operating the information storage unit to store information on a group fighting event of the game involving at least a first group and a second group,
   operating the control unit to perform processing to provide the group fighting event such that the first group, the second group, and one or more participants who do not belong to a group that is engaged in the group fighting event participate in the group fighting event, wherein the group fighting event further includes at least one watcher who does not fight during at least one portion of the group fighting event; and
   when the group fighting event ends, operating the control unit to display a bulletin-board at terminal devices of players who fought in the group fighting event, said players including at least players in the first group, players in the second group, and the one or more participants, the bulletin-board enabling a communication among the players.

12. The method according to claim 11, wherein the bulletin-board further comprises a graphical user interface element that is configured to send an application to at least one of the first group or the second group when activated.

13. The method according to claim 12, further comprising:
   receiving, from a terminal device of a participant in the one or more participants, a selection of the graphical user interface element;
   operating the control unit to generate a popup confirmation notification on the terminal device of the participant; and
   adding the participant to one of the first group or the second group.

14. The method according to claim 13, further comprising:
   operating the control unit to display a notification on each terminal device of one of the set of: players in the first group, and players in the second group.

15. The method according to claim 13, further comprising:
   enabling a membership incentive for the participant.

16. The method according to claim 11, wherein the control unit is operated to display the bulletin-board for a time period from an end of the group fighting event to a beginning of a second group fighting event.

17. The method according to claim 11, wherein the bulletin board displays a listing of members of each of the first group and the second group, and the control unit is further operated to display, when a menu is selected, information on each member in the listing of members.

18. The method according to claim 11, further comprising operating the control unit to perform processing to provide the group fighting event such that the one or more participants are restricted to a predetermined level range.

19. The method according to claim 11, further comprising operating the control unit to perform processing to provide the group fighting event such that the one or more participants participate in attacks in a second position tier, and wherein the control unit is operated to restrict the one or more participants from entry into a first positional tier.

20. A non-transitory recording medium that provides a game, in which a plurality of players can participate, that is connected to terminal devices operated by the players via a communication line, and that can access an information storage unit that stores information on a group fighting event of the game involving at least a first group and a second group, the recording medium having stored thereon a computer program to configure the computer to:
- access the information storage unit to perform processing to display an image of the game at the terminal devices;
- display the group fighting event, the group fighting event comprising one or more interactions between the first group, the second group, and one or more participants who do not belong to a group that is engaged in the group fighting event participate in the group fighting event, wherein the group fighting event further includes at least one watcher who does not fight during at least one portion of the group fighting event; and
- after the group fighting event ends, display a bulletin-board at the terminal devices of players who fought in the group fighting event, said players including at least players in the first group, players in the second group, and the one or more participants, the bulletin-board enabling a communication among the players.

* * * * *